United States Patent
Tippelhofer

(10) Patent No.: US 10,850,683 B1
(45) Date of Patent: Dec. 1, 2020

(54) ELECTRICAL CONNECTIONS USING VEHICLE BRAKE LINES

(71) Applicant: Mario Tippelhofer, Campbell, CA (US)

(72) Inventor: Mario Tippelhofer, Campbell, CA (US)

(73) Assignee: Apple Inc., Cupertino, CA (US)

( * ) Notice: Subject to any disclaimer, the term of this patent is extended or adjusted under 35 U.S.C. 154(b) by 871 days.

(21) Appl. No.: 15/351,691

(22) Filed: Nov. 15, 2016

Related U.S. Application Data

(60) Provisional application No. 62/257,969, filed on Nov. 20, 2015.

(51) Int. Cl.
*B60R 16/03* (2006.01)
*B60R 16/023* (2006.01)
*B60R 16/02* (2006.01)
*B60T 17/04* (2006.01)

(52) U.S. Cl.
CPC ........ *B60R 16/0215* (2013.01); *B60R 16/023* (2013.01); *B60T 17/04* (2013.01); *B60R 16/03* (2013.01)

(58) Field of Classification Search
CPC ... B60R 16/0215; B60R 16/023; B60R 16/03; B60T 17/04
See application file for complete search history.

(56) References Cited

U.S. PATENT DOCUMENTS

| | | | |
|---|---|---|---|
| 3,544,803 A * | 12/1970 | Taylor | G08C 15/12 307/10.1 |
| 3,749,814 A | 7/1973 | Pratt | |
| 6,515,376 B1 * | 2/2003 | Mederer | B60Q 1/305 307/10.1 |
| 8,950,828 B2 | 2/2015 | Martin | |
| 2005/0040709 A1 * | 2/2005 | Enders | B60R 16/0315 307/10.1 |
| 2010/0062897 A1 * | 3/2010 | Nishino | B60T 7/042 477/29 |
| 2010/0308575 A1 | 12/2010 | Rodenburg | |
| 2012/0136539 A1 * | 5/2012 | Bryant | B60T 8/175 701/42 |
| 2016/0001753 A1 * | 1/2016 | Georgin | B60T 8/1703 303/20 |

* cited by examiner

*Primary Examiner* — Rexford N Barnie
*Assistant Examiner* — Terrence R Willoughby
(74) *Attorney, Agent, or Firm* — Young Basile Hanlon & MacFarlane, P.C.

(57) ABSTRACT

An apparatus includes a first electrical component, a second electrical component, and a brake line. At least part of an electrical connection between the first electrical component and the second electrical component is defined by the brake line. The electrical connection may be a secondary electrical connection for rerouting an electrical path. The brake line may include first and second tubular conductive structures for defining first and second electrical connections. A repeater may be used to retransmit a data signal along the brake line. A nonconductive layer may be disposed on a tubular conductive structure of the brake line. A controller may switch operation of the brake line between an electrical power transmission mode and a data signal transmission mode. A controller may be operable determine a connected state or a disconnected state of the brake using the electrical connection.

6 Claims, 7 Drawing Sheets

ELECTRICAL CONNECTIONS USING VEHICLE BRAKE LINES

CROSS-REFERENCE TO RELATED APPLICATIONS

This application claims the benefit of U.S. Provisional Application No. 62/257,969, filed on Nov. 20, 2015, the content of which is hereby incorporated by reference in its entirety for all purposes.

FIELD

The disclosure relates generally to the field of vehicle electrical systems.

BACKGROUND

Vehicles include a large number of sensors, actuators, switches, lamps, and other electrical components that are located throughout the vehicle. Each of these components is served by one or more electrical connections that supply electrical power and/or transmit signals either to or from a component.

Typically, electrical connections to and from components are provided by a wire harness. A wire harness is an assembly of electrical conductors (i.e. wires or cables) that are bundled together and serve to transmit electrical power and signals. As vehicles have incorporated increasingly larger numbers of electrical components such as sensors and actuators, the complexity and weight of the required wiring harness has grown. In addition, redundant electrical connections are sometimes provided for certain critical components, which further increases the complexity and weight of the wiring harness.

SUMMARY

One aspect of the disclosure is an apparatus that includes a first electrical component, a second electrical component, and a brake line. The apparatus also includes a primary electrical connection from the first electrical component to the second electrical component and a secondary electrical connection from the first electrical component to the second electrical component. At least part of the secondary electrical connection is formed by the brake line. The apparatus also includes a circuit such as a switch for rerouting an electrical path from the primary electrical connection to the secondary electrical connection.

Another aspect of the disclosure is an apparatus that includes a first electrical component, a second electrical component, and a brake line. The brake line has a first conductive tubular structure having a hollow interior for transporting hydraulic fluid, a second conductive tubular structure, and an insulator material that electrically isolates the first conductive tubular structure and the second tubular conductive structure. The first conductive tubular structure defines at least part of a first electrical path between the first electrical component and the second electrical component. The second conductive tubular structure defines at least part of a second electrical path between the first electrical component and the second electrical component.

Another aspect of the disclosure is an apparatus that includes a first electrical component, a second electrical component, a first brake line portion that forms part of a first data signal path that is connected to the first electrical component, and a second brake line portion that forms part of a second data signal path that is connected to the second electrical component. The apparatus also includes a repeater that receives a data signal from the first electrical component over first data signal path and transmits the data signal to the second electrical component over the second data signal path.

Another aspect of the disclosure is an apparatus that includes a first electrical component, a second electrical component, a brake line having a conductive tubular structure having a hollow interior for transporting hydraulic fluid, and a nonconductive layer applied to the conductive tubular structure. The conductive tubular structure of the brake line defines at least part of an electrical connection from the first electrical component to the second electrical component.

Another aspect of the disclosure is an apparatus that includes a first electrical component, a second electrical component, a brake line, and an electrical connection from the first electrical component to the second electrical component. At least part of the electrical connection is formed by the brake line. The apparatus also includes controller that is operable to switch operation of the electrical connection between a first mode in which electrical power is transmitted using the electrical connection and a second mode in which a data signal is transmitted using the electrical connection.

Another aspect of the disclosure is an apparatus that includes a brake line, a first hydraulic component, and a second hydraulic component. The brake line is connected to the first hydraulic component and the second hydraulic component to allow fluid communication between the first hydraulic component and the second hydraulic component. The apparatus also includes an electrical connection that includes at least a portion of the brake line, and a controller that is operable to determine a connected state or a disconnected state of the brake line with respect to the first hydraulic component and the second hydraulic component using the electrical connection.

BRIEF DESCRIPTION OF THE DRAWINGS

The detailed description makes reference to the accompanying drawings, wherein like reference numerals refer to like parts through several views.

DETAILED DESCRIPTION

This disclosure relates to electrical connections that are made using vehicle brake lines. Vehicle brake lines are typically formed of metal. Some materials that can be used to form brake lines also exhibit usable levels of electrical conductivity. For example, copper-nickel alloys possess qualities that make them suitable for use in forming brake lines, such as strength and corrosion resistance, and are also usable as electrical conductors.

The implementations described herein utilize a vehicle brake line as part of an electrical connection. Both data signal and power connections are contemplated.

Figure 1:
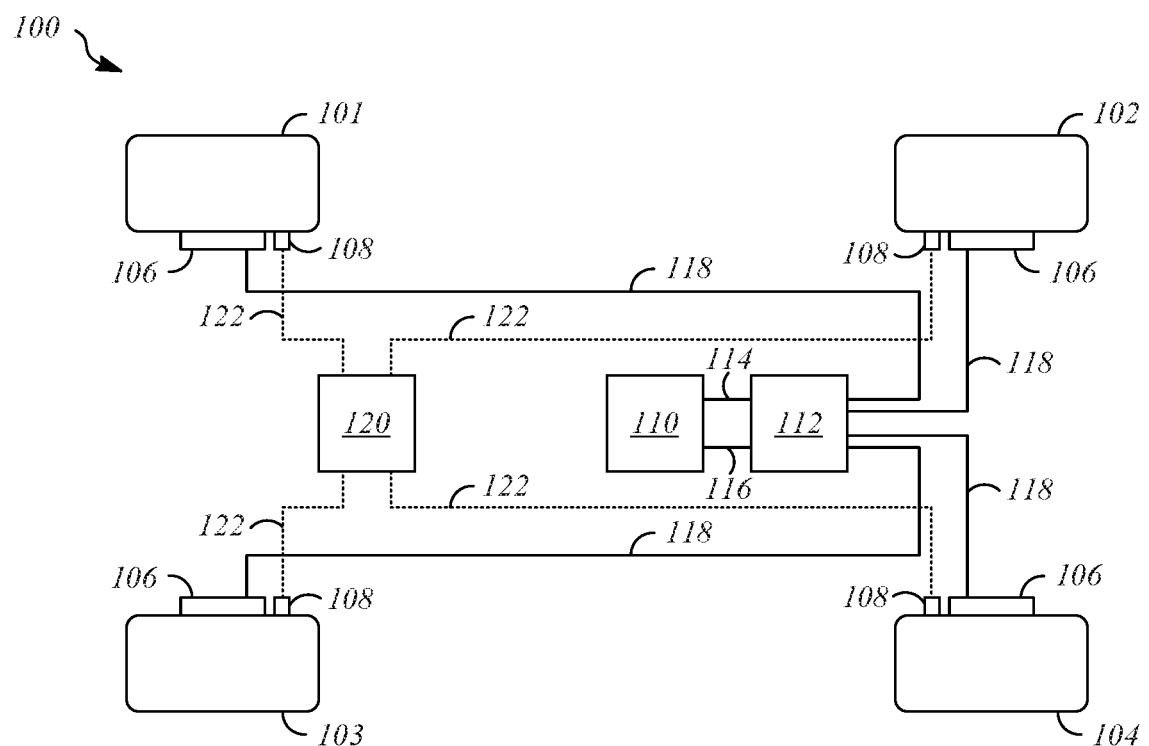
FIG. 1 is a block diagram showing a vehicle.

FIG. 1 shows portions of a vehicle 100 that includes a plurality of wheels that support the vehicle 100 with respect to a surface and can be utilized for functions such as steering and power delivery. The plurality of wheels includes a first wheel 101, a second wheel 102, a third wheel 103, and a fourth wheel 104. Similar electrical and hydraulic components can be associated with each of the first wheel 101, the second wheel 102, the third wheel 103, and the fourth wheel 104, such as by mounting the components on or near the respective wheel 101-104. An example of a hydraulic component is a hydraulically-actuated brake 106 that is operable to decelerate the wheel 101-104 that it is mounted to. The hydraulically-actuated brake 106 can be of any type, such as a drum brake or a disc brake, each of which are operated by fluid pressure that is delivered to a piston (not shown). An example of an electrical component is a sensor 108, such as a wheel speed sensor that is operable to output a data signal that represents the speed of the wheel 101-104 that it is mounted to. Other types of hydraulic components and electrical components can be included at each wheel 101-104 and utilized with the systems that are described herein.

The vehicle 100 includes hydraulic components that supply fluid pressure to each hydraulically-actuated brake 106. In the illustrated implementation, the vehicle includes hydraulic actuator 110 and a hydraulic modulator 112.

The hydraulic actuator 110 pressurizes hydraulic fluid (e.g. brake fluid). In one implementation, the hydraulic actuator 110 is a manually operated assembly, such as a brake pedal and a master cylinder. In another implementation, the hydraulic actuator 110 can include an electromechanical actuator that pressurizes the hydraulic fluid in response to a control signal, such as in a vehicle that implements autonomous or semi-autonomous control.

The hydraulic actuator 110 is connected to the hydraulic modulator 112 by a supply line 114 that transmits pressurized hydraulic fluid from the hydraulic actuator 110 to the hydraulic modulator 112. The hydraulic actuator 110 is also connected to the hydraulic modulator 112 by a return line 116, by which excess hydraulic fluid is transmitted back to the hydraulic actuator 110 from the hydraulic modulator 112.

The hydraulic modulator 112 modulates the fluid pressure that is communicated to each of the hydraulically-actuated brakes 106. The pressure modulation applied by the hydraulic modulator 112 can be controlled to prevent lockup of each of the wheels 101-104, as part of an antilock braking system. Hydraulic fluid is communicated from the hydraulic modulator 112 to each of the hydraulically-actuated brakes by a respective brake line 118.

The vehicle 100 includes an electrical component such as an electronic control unit 120 that is operable to transmit or receive power and/or data signals to or from electrical components associated with the wheels 101-104, such as the sensors 108. The electronic control unit 120 can include data signal and power connections, and can include a processor that is operable to execute instructions that are stored in a memory. The electronic control unit 120 is connected to each of the sensors 108 by a respective electrical connection, which can be one or more electrical conductors 122. In some implementations, each of the electrical conductors 122 is part of a wire harness (not shown).

Figure 2:
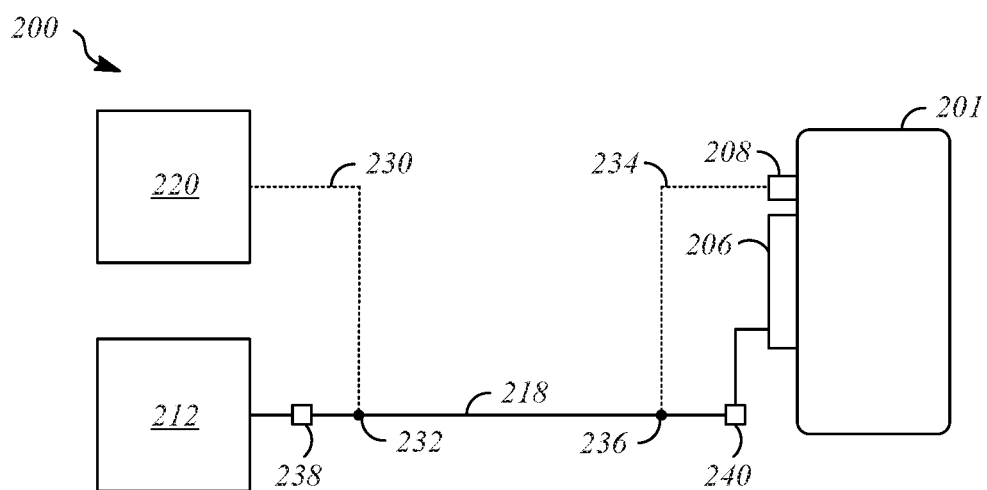
FIG. 2 is a block diagram showing a hydraulic connection and an electrical connection according to a first example.

FIG. 2 is a block diagram showing a portion of a vehicle 200 including a hydraulic connection and an electrical connection to components that are associated with a first wheel 201. The same components can be utilized with other wheels (not shown) of the vehicle 200.

The hydraulic connection is made between a first hydraulic component, such as a hydraulic modulator 212, and a second hydraulic component, such as a hydraulically-actuated brake 206 that is mounted to the first wheel 201. A brake line 218 establishes fluid communication between the hydraulic modulator 212 and the hydraulically-actuated brake 206 to allow transmission of pressurized hydraulic fluid through the brake line 218.

The electrical connection is made between a first electrical component, such as an electronic control unit 220, and a second electrical component, such as a sensor 208. The electrical connection from the electronic control unit 220 to the sensor 208 includes a first electrical conductor 230 that extends from the electronic control unit 220 to a first electrical connector 232 that is in electrical communication with the brake line 218. The electrical connection from the electronic control unit 220 to the sensor 208 also includes a second electrical conductor 234. The second electrical conductor 234 extends from a second electrical connector 236 that is in electrical communication with the brake line 218 to the sensor 208. The first electrical conductor 230 and the second electrical conductor 234 can each be, for example, one or more wires from a wire harness. Accordingly, the electrical connection from the electronic control unit 220 to the sensor 208 includes the first electrical conductor 230, at least a portion of the brake line 218, and the second electrical conductor 234. In one implementation the electrical connection is a data signal path between the electronic control unit 220 and the sensor 208, and can be either unidirectional or bidirectional. In another implementation the electrical connection supplies electrical power from the electronic control unit 220 to the sensor 208.

To electrically isolate the hydraulic modulator 212 from the electrical connection, a first insulator 238 is disposed at any point along the brake line 218 between the hydraulic modulator 212 and the first electrical connector 232. To electrically isolate the hydraulically-actuated brake 206 from the electrical connection, a second insulator 240 is disposed at any point along the brake line 218 between the hydraulically-actuated brake 206 and the second electrical connector 236.

Figure 3:
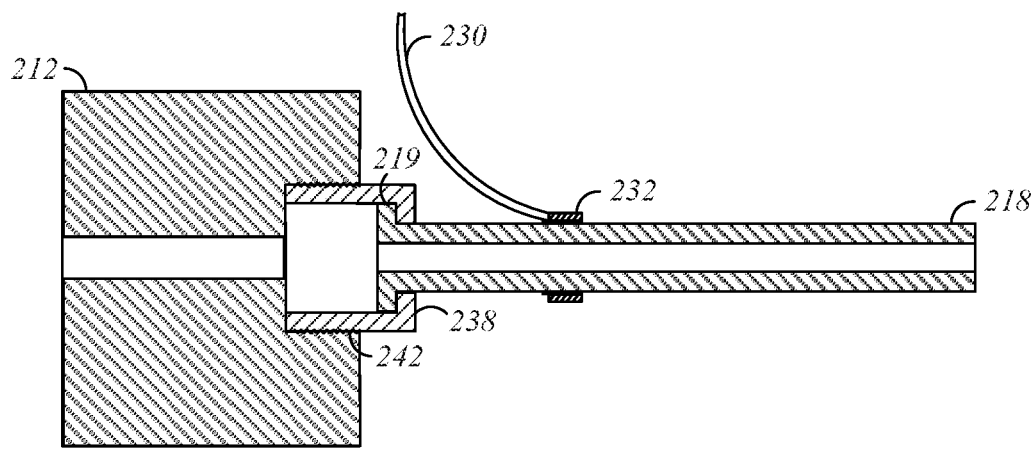
FIG. 3 is a cross-section diagram showing connection of a brake line to a hydraulic component using a non-conductive coupler.

FIG. 3 shows connection of the brake line 218 to the hydraulic modulator 212. In the illustrated implementation, the first insulator 238 may be a fluid coupler that connects the brake line 218 to a bore 242 formed in the hydraulic modulator 212. The first insulator 238 may be retained on the brake line 218 by a flare 219 at the end of the brake line 218, and prevents the brake line 218 from contacting the hydraulic modulator 212, which may be made of a conductive metal such as aluminum. The second insulator 240 may be similar to the first insulator 238. Other implementations are possible for the first insulator 238 and the second insulator 240.

In the illustrated implementation, the first electrical connector 232 may be a cable clamp that secures part of the first electrical conductor 230 to the brake line 218. Alternatively, other electrical couplers may be used for electrical connectors 232 and 236. The second electrical connector 236 may be similar to the first electrical connector 232. Other implementations of the first electrical connector 232 and the second electrical connector 236 are possible.

Figure 4:
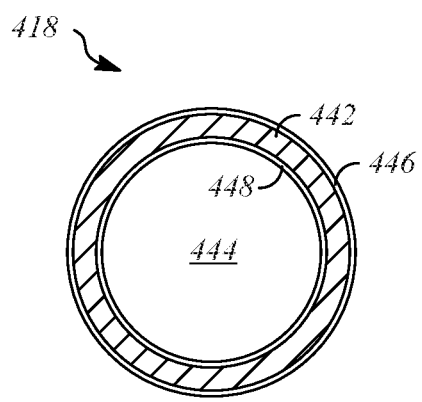
FIG. 4 is a cross-section diagram of a brake line having non-conductive layers.

FIG. 4 is a cross-section diagram of a brake line 418 that can be used in place of the brake line 218 of the vehicle 200 or in any other implementation herein. The brake line 418 has a conductive tubular structure 442 and a hollow interior 444 for transporting hydraulic fluid. The conductive tubular structure 442 can be similar to a conventional brake line and can be formed of any suitable material such as a copper nickel alloy. A nonconductive layer is applied to the conductive tubular structure 442. The nonconductive layer can be of any material that acts as an electrical insulator, and can be applied in any suitable way, such as in the form of a coating or wrap.

In the illustrated example, a first nonconductive layer 446 is disposed on an exterior surface of the conductive tubular structure 442 and a second nonconductive layer 448 is disposed on an interior surface of the conductive tubular structure 442. In other implementations only one of the first nonconductive layer 446 or the second nonconductive layer 448 is applied to the conductive tubular structure 442. The first nonconductive layer 446 can prevent adverse effects from contact of the conductive tubular structure 442 with other metallic objects, such as electrical interference or inadvertent transfer of electrical power to the metallic objects. The second nonconductive layer 448 can prevent adverse effects from movement of the hydraulic fluid in the hollow interior 444 of the conductive tubular structure 442, such as interference from static electricity.

Figure 5:
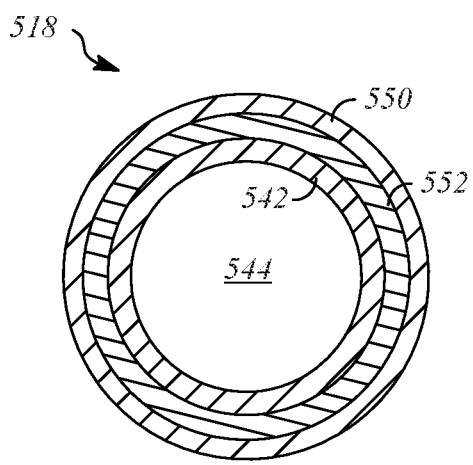
FIG. 5 is a cross-section diagram of a brake line having a first tubular conductive structure and a second tubular conductive structure separated by an insulator material.

FIG. 5 is a cross-section diagram of a brake line 518. The brake line 518 has a first tubular conductive structure 542 and a second tubular conductive structure 550 separated by an electrically non-conductive material such as an insulator material 552. The first tubular conductive structure 542 and the second tubular conductive structure 550 are formed of a conductive material such as metal (e.g. copper-nickel alloy). As an example, the insulator material 552 can be plastic. Optionally, nonconductive layers can be applied to the interior of the first tubular conductive structure 542 and the exterior of the second tubular conductive structure 550, in the manner described with respect to the first nonconductive layer 446 and the second nonconductive layer 448 of the brake line 418.

The second tubular conductive structure 550 is disposed radially outward from the first tubular conductive structure 542, such that the first tubular conductive structure 542 extends through the second tubular conductive structure 550. The insulator material 552 can be bonded to both the first tubular conductive structure 542 and the second tubular conductive structure 550 to restrain relative movement. The first tubular conductive structure 542 has a hollow interior 544 for transporting hydraulic fluid. By using the brake line 518 in place of the brake line 218 in the vehicle 200, a first electrical connection and a second electrical connection can be made simultaneously using the brake line 518.

The brake line 518 can be utilized in a number of ways. In one implementation, the brake line 518 can be used to allow bidirectional transmission of data signals between the first and second electrical components by defining a first data signal path using the first tubular conductive structure 542 and a second data signal path using the second tubular conductive structure 550. In another implementation, the first tubular conductive structure 542 of the brake line 518 can be used to supply between electrical components (e.g. between the first and second electrical components), while the second tubular conductive structure 550 can be used as a data signal path between electrical components (e.g. the first and second electrical components or third and fourth electrical components or a combination thereof). In another implementation, the first tubular conductive structure 542 of the brake line 518 can be used to define a first electrical connection between the first and second electrical components, while the second tubular conductive structure 550 can be used to define a second electrical connection between third and fourth electrical components. In another implementation, the first tubular conductive structure 542 and or the second tubular conductive structure 550 of the brake line 518 can be used as a secondary electrical connection between electrical components, where a primary electrical connection is utilized in normal operation and the secondary electrical connection using the brake line 518 is utilized if the primary electrical connection fails. Other uses of the brake line 518 are possible.

Figure 6:
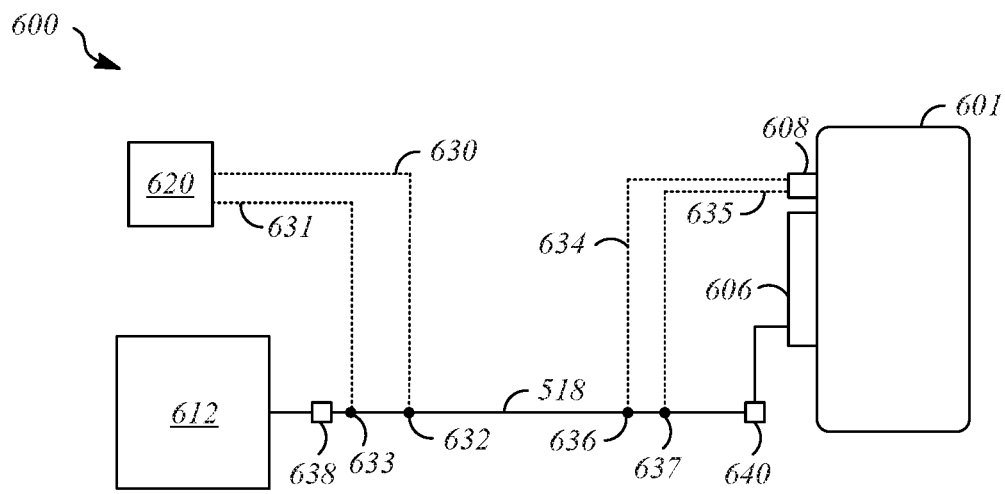
FIG. 6 is a block diagram showing a first and second electrical connections according to a second example.

FIG. 6 is a block diagram showing a portion of a vehicle 600 that incorporates the brake line 518 to define a hydraulic connection, an electrical connection, and a second electric connection to components that are associated with a first wheel 601. The same components can be utilized with other wheels (not shown) of the vehicle 600.

The hydraulic connection is made between a first hydraulic component, such as a hydraulic modulator 612, and a second hydraulic component, such as a hydraulically-actuated brake 606 that is mounted to the first wheel 601. The brake line 518 establishes fluid communication between the hydraulic modulator 612 and the hydraulically-actuated brake 606 to allow transmission of pressurized hydraulic fluid through the brake line 518.

The first and second electrical connections are made between a first electrical component, such as an electronic control unit 620, which may also be referred to herein as a controller, and a second electrical component, such as a sensor 608.

The first electrical connection from the electronic control unit 620 to the sensor 608 is an electrical power supply connection that includes a first power conductor 630 that extends from the electronic control unit 620 to a first electrical connector 632 that is in electrical communication with a portion of the brake line 518, such as the first tubular conductive structure 542. The first electrical connection from the electronic control unit 620 to the sensor 608 also includes a second power conductor 634. The second power conductor 634 extends from a second electrical connector 636 to the sensor 608 and is operable to transmit the electrical power to the sensor 608. The first power conductor 630 and the second power conductor 634 can each be, for example, one or more wires from a wire harness. Accordingly, the first electrical connection from the electronic control unit 620 to the sensor 608 includes the first power conductor 630, at least a portion of the brake line 518 such as the first tubular conductive structure 542, and the second power conductor 634.

The second electrical connection from the electronic control unit 620 to the sensor 608 is a data signal connection that includes a first data signal conductor 631 that extends from the electronic control unit 620 to a third electrical connector 633 that is in electrical communication with a portion of the brake line 518, such as the second tubular conductive structure 550. The second electrical connection from the electronic control unit 620 to the sensor 608 also includes a second data signal conductor 635. The second data signal conductor 635 extends from a fourth electrical connector 637 to the sensor 608 and is operable to transmit the data signal to the sensor 608. The first data signal conductor 631 and the second data signal conductor 635 can each be, for example, one or more wires from a wire harness. Accordingly, the second electrical connection from the electronic control unit 620 to the sensor 608 includes the first data signal conductor 631, at least a portion of the brake line 518 such as the second tubular conductive structure 550, and the second data signal conductor 635.

To electrically isolate the hydraulic modulator 612 from the electrical connection, a first insulator 638 is disposed at any point along the brake line 518 between the hydraulic modulator 612 and the first electrical connector 632 and the third electrical connector 633. To electrically isolate the hydraulically-actuated brake 606 from the electrical connection, a second insulator 640 is disposed at any point along the brake line 518 between the hydraulically-actuated brake 606 and the second electrical connector 636 and the fourth electrical connector 637.

Figure 7:
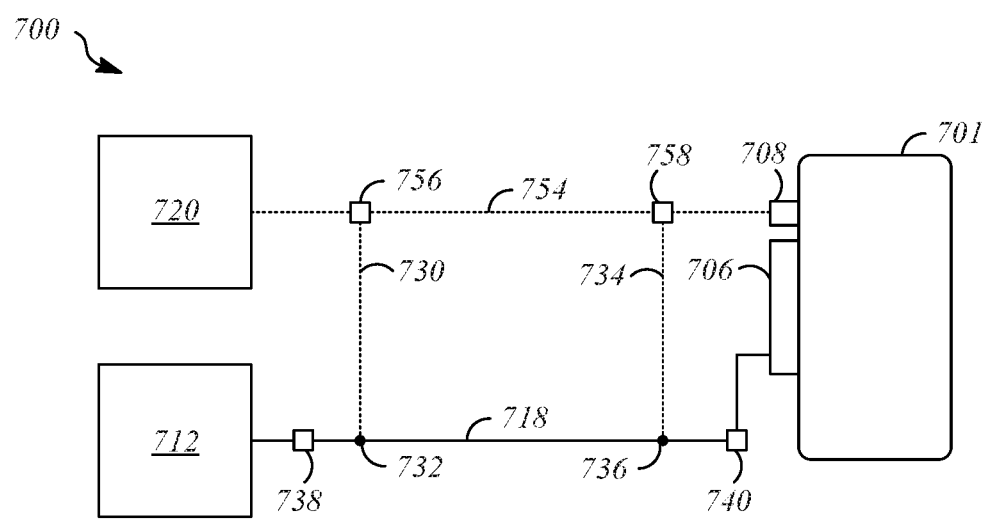
FIG. 7 is a block diagram showing a hydraulic connection, a primary electrical connection, and a secondary electrical connection according to a third example.

The brake line also can be used as a secondary electrical connection between electrical components, where a primary electrical connection (e.g., using a wire harness) is utilized in normal operation and the secondary electrical connection using the brake line is utilized if the primary electrical connection fails. FIG. 7 is a block diagram showing a portion of a vehicle 700 including a hydraulic connection, a primary electrical connection, and a secondary electrical connection to components that are associated with a first wheel 701. The same components can be utilized with other wheels (not shown) of the vehicle 700.

The hydraulic connection is made between a first hydraulic component, such as a hydraulic modulator 712, and a second hydraulic component, such as a hydraulically-actuated brake 706 that is mounted to the first wheel 701. A brake line 718 establishes fluid communication between the hydraulic modulator 712 and the hydraulically-actuated brake 706 to allow transmission of pressurized hydraulic fluid through the brake line 718.

The primary electrical connection is made between a first electrical component, such as an electronic control unit 720, and a second electrical component, such as a sensor 708. The primary electrical connection from the electronic control unit 720 to the sensor 708 includes a primary electrical conductor 754 that extends from the electronic control unit 720 to the sensor 708.

A first circuit such as a first switch 756 and a second circuit such as a second switch 758 are in electrical communication with the electronic control unit 720 and the sensor 708 to reroute a path of electrical communication between the electronic control unit 720 and the sensor 708 from the primary electrical connection to the secondary electrical connection. In the illustrated example, the first switch 756 and the second switch 758 are each connected to the primary electrical conductor 754. The first switch 756 and the second switch 758 could be connected in other ways, such as directly to the electronic control unit 720 and the sensor 708. By including two switches, the illustrated implementation allows part of the secondary electrical connection to be unutilized and de-energized while the primary electrical connection is active. Similar functionality can be achieved using a single switch. In such an implementation the secondary electrical path remains energized.

The first switch 756 and the second switch 758 can be any component or circuit operable to redirect an electrical path between two components. In one implementation the first switch 756 and the second switch 758 are simple circuits that utilize diodes to redirect the electrical path from the primary electrical connection to the secondary electrical connection upon interruption of power supply along the primary electrical connection. In another implementation a controller such as the electronic control unit 720 provides signals to the first switch 756 and the second switch 758 to cause the first switch 756 and the second switch 758 to reroute the electrical path from the primary electrical connection to the secondary electrical connection, such as in response to failure of the primary electrical connection.

The secondary electrical connection is defined at least in part by the brake line 718. A first branch conductor 730 extends from the first switch 756 to a first electrical connector 732 that is in electrical communication with the brake line 718. The secondary electrical connection from the electronic control unit 720 to the sensor 708 also includes a second branch conductor 734. The second branch conductor 734 extends from a second electrical connector 736 that is in electrical communication with the brake line 718 to the second switch 758. The first branch conductor 730 and the second branch conductor 734 can each be, for example, one or more wires from a wire harness. Accordingly, the secondary electrical connection from the electronic control unit 720 to the sensor 708 includes the first branch conductor 730, at least a portion of the brake line 718, and the second branch conductor 734. In one implementation the secondary electrical connection is a data signal path between the electronic control unit 720 and the sensor 708, and can be either unidirectional or bidirectional. In another implementation the secondary electrical connection supplies electrical power from the electronic control unit 720 to the sensor 708. In another implementations, the secondary electrical connection simultaneously provides a data signal path and a supply of electrical power from the electronic control unit 720 to the sensor 708, such as by incorporating multiple conductors in the brake line 718 as described with respect to the brake line 518 or using power line communication techniques.

To electrically isolate the hydraulic modulator 712 from the electrical connection, a first insulator 738 is disposed at any point along the brake line 718 between the hydraulic modulator 712 and the first electrical connector 732. To electrically isolate the hydraulically-actuated brake 706 from the electrical connection, a second insulator 740 is disposed at any point along the brake line 718 between the hydraulically-actuated brake 706 and the second electrical connector 736.

Figure 8:
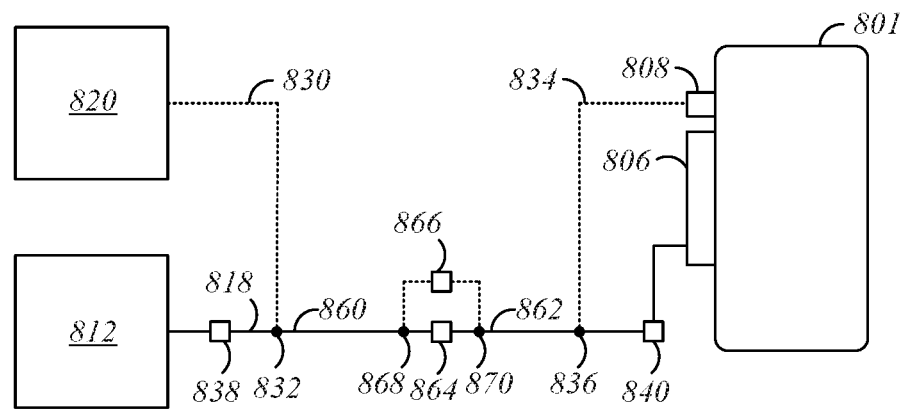
FIG. 8 is a block diagram showing a hydraulic connection and an electrical connection that includes a repeater according to a fourth example.

FIG. 8 is a block diagram showing a portion of a vehicle 800 including a hydraulic connection and an electrical connection to components that are associated with a first wheel 801. The same components can be utilized with other wheels (not shown) of the vehicle 800.

The hydraulic connection is made between a first hydraulic component, such as a hydraulic modulator 812, and a second hydraulic component, such as a hydraulically-actuated brake 806 that is mounted to the first wheel 801. A brake line 818 establishes fluid communication between the hydraulic modulator 812 and the hydraulically-actuated brake 806 to allow transmission of pressurized hydraulic fluid through the brake line 818.

The electrical connection is made between a first electrical component, such as an electronic control unit 820, and a second electrical component, such as a sensor 808. The electrical connection from the electronic control unit 820 to the sensor 808 includes a first electrical conductor 830 that extends from the electronic control unit 820 to a first electrical connector 832 that is in electrical communication with the brake line 818. The electrical connection from the electronic control unit 820 to the sensor 808 also includes a second electrical conductor 834. The second electrical conductor 834 extends from a second electrical connector 836 that is in electrical communication with the brake line 818 to the sensor 808. The first electrical conductor 830 and the second electrical conductor 834 can each be, for example, one or more wires from a wire harness. Accordingly, the electrical connection from the electronic control unit 820 to the sensor 808 includes the first electrical conductor 830, at least a portion of the brake line 818, and the second electrical conductor 834.

The electrical connection is a data signal path between the electronic control unit 820 and the sensor 808, and can be either unidirectional or bidirectional. In order to ensure effective data signal transmissions along the electrical connection, the brake line 818 includes a first portion 860 and a second portion 862 that are connected by an insulated fluid coupler 864. The insulated fluid coupler 864 is positioned between the first electrical connector 832 and the second electrical connector 836 to prevent power or data signals from travelling directly between the first portion 860 and the second portion 862 of the brake line 818. A repeater 866 is connected to the first portion 860 and the second portion 862 of the brake line 818 by repeater connectors 868, 870, and the first portion 860 and the second portion 862 serve as parts of first and second data signal paths that are in electrical connection with the repeater 866. The repeater 866 receives a data signal from one of the electronic control unit 820 or the sensor 808 and retransmits it at a higher level or higher power.

To electrically isolate the hydraulic modulator 812 from the electrical connection, a first insulator 838 is disposed at any point along the brake line 818 between the hydraulic modulator 812 and the first electrical connector 832. To electrically isolate the hydraulically-actuated brake 806 from the electrical connection, a second insulator 840 is disposed at any point along the brake line 818 between the hydraulically-actuated brake 806 and the second electrical connector 836.

Figure 9:
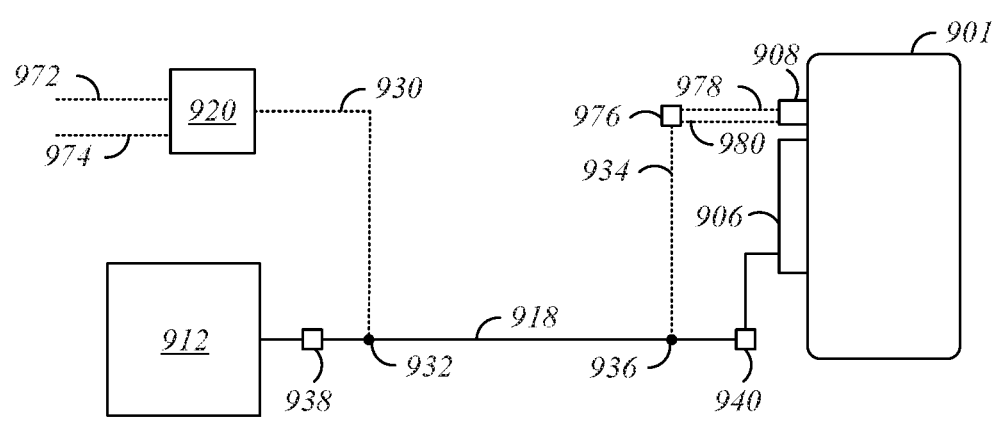
FIG. 9 is a block diagram showing a hydraulic connection and an electrical connection that switches operation between a first mode and a second mode according to a fifth example.

FIG. 9 is a block diagram showing a portion of a vehicle 900 including a hydraulic connection and an electrical connection to components that are associated with a first wheel 901. The same components can be utilized with other wheels (not shown) of the vehicle 900.

The hydraulic connection is made between a first hydraulic component, such as a hydraulic modulator 912, and a second hydraulic component, such as a hydraulically-actuated brake 906 that is mounted to the first wheel 901. A brake line 918 establishes fluid communication between the hydraulic modulator 912 and the hydraulically-actuated brake 906 to allow transmission of pressurized hydraulic fluid through the brake line 918.

The electrical connection is made between a first electrical component, such as an electronic control unit 920, which may also be referred to herein as a controller, and a second electrical component, such as a sensor 908. The electronic control unit 920 receives a data signal from a data signal input 972. The electronic control unit 920 receives a supply of electrical power from a power supply 974. In this implementation, operation of the electrical connection can be switched by the electronic control unit 920 between a first mode in which the electrical power is transmitted using the electrical connection and a second mode in which the data signal is transmitted using the electrical connection. The electronic control unit 920 can be further operable to operate the electrical connection in a third mode in which electrical power and a data signal are simultaneously transmitted over the electrical connection using by modulation of the electrical power such as by using power line communication techniques and related hardware components.

The electrical connection from the electronic control unit 920 to the sensor 908 includes a first electrical conductor 930 that extends from the electronic control unit 920 to a first electrical connector 932 that is in electrical communication with the brake line 918. The electrical connection from the electronic control unit 920 to the sensor 908 also includes a second electrical conductor 934. The second electrical conductor 934 extends from a second electrical connector 936 that is in electrical communication with the brake line 918 to a switch 976. The switch 976 is connected to the sensor 908 by a power conductor 978 and a data signal conductor 980, is operable to transmit the electrical power to the sensor 908 using the power conductor 978 when electrical power is being transmitted using the electrical connection, and is operable to transmit the data signal to the sensor 908 using the data signal conductor 980 when the data signal is being transmitted using the electrical connection. The first electrical conductor 930, the second electrical conductor 934, the power conductor 978, and the data signal conductor 980 can each be, for example, one or more wires from a wire harness. Accordingly, the electrical connection from the electronic control unit 920 to the sensor 908 includes the first electrical conductor 930, at least a portion of the brake line 918, the second electrical conductor 934, and one of the power conductor 978 or the data signal conductor 980 dependent upon the current operating mode. Thus, the electrical connection can be a data signal path between the electronic control unit 920 and the sensor 908, or can supply electrical power from the electronic control unit 920 to the sensor 908 dependent upon the operating mode.

To electrically isolate the hydraulic modulator 912 from the electrical connection, a first insulator 938 is disposed at any point along the brake line 918 between the hydraulic modulator 912 and the first electrical connector 932. To electrically isolate the hydraulically-actuated brake 906 from the electrical connection, a second insulator 940 is disposed at any point along the brake line 918 between the hydraulically-actuated brake 906 and the second electrical connector 936.

Figure 10:
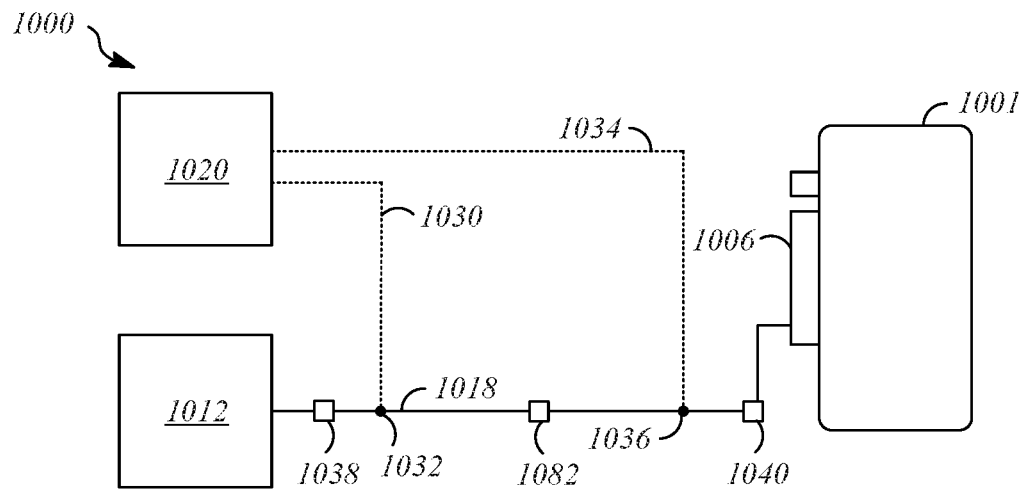
FIG. 10 is a block diagram showing a hydraulic connection and an electrical connection according to a sixth example.

FIG. 10 is a block diagram showing a portion of a vehicle 1000 including a hydraulic connection and an electrical connection to components that are associated with a first wheel 1001. The same components can be utilized with other wheels (not shown) of the vehicle 1000.

The hydraulic connection is made between a first hydraulic component, such as a hydraulic modulator 1012, and a second hydraulic component, such as a hydraulically-actuated brake 1006 that is mounted to the first wheel 1001. A brake line 1018 establishes fluid communication between the hydraulic modulator 1012 and the hydraulically-actuated brake 1006 to allow transmission of pressurized hydraulic fluid through the brake line 1018. The brake line 1018 includes two or more sections that are connected using fluid-carrying couplers such as a coupler 1082. The coupler 1082 is formed from an electrically conductive material.

In this implementation, the electrical connection includes at least a portion of the brake line 1018 and a connected state or a disconnected state of the brake line 1018 with respect to the hydraulic modulator 1012 and the hydraulically-actuated brake 1006 can be detected using the electrical connection.

The electrical connection is connected to a controller such as an electronic control unit 1020, and includes a first electrical conductor 1030 that extends from the electronic control unit 1020 to a first electrical connector 1032 that is in electrical communication with the brake line 1018. A second electrical conductor 1034 extends from a second electrical connector 1036 that is in electrical communication with the brake line 1018 back to the electronic control unit 1020 or to a common ground. The first electrical conductor 1030 and the second electrical conductor 1034 can each be, for example, one or more wires from a wire harness. The first electrical connector 1032 is positioned between the hydraulic modulator 1012 and the coupler 1082. The second electrical connector is positioned between the hydraulically-actuated brake 1006 and the coupler 1082. Thus, the first electrical connector 1032 and the second electrical connector 1036 are positioned on opposite sides of the coupler 1082. Thus, the electrical connection includes the coupler 1082 and will be disconnected if the coupler 1082 is disconnected. The electronic control unit 1020 is operable to test continuity of the electrical connection. Failure of a continuity test indicates that the coupler 1082 is disconnected.

To electrically isolate the hydraulic modulator 1012 from the electrical connection, a first insulator 1038 is disposed at any point along the brake line 1018 between the hydraulic modulator 1012 and the first electrical connector 1032. To electrically isolate the hydraulically-actuated brake 1006 from the electrical connection, a second insulator 1040 is disposed at any point along the brake line 1018 between the hydraulically-actuated brake 1006 and the second electrical connector 1036.

Figure 11:
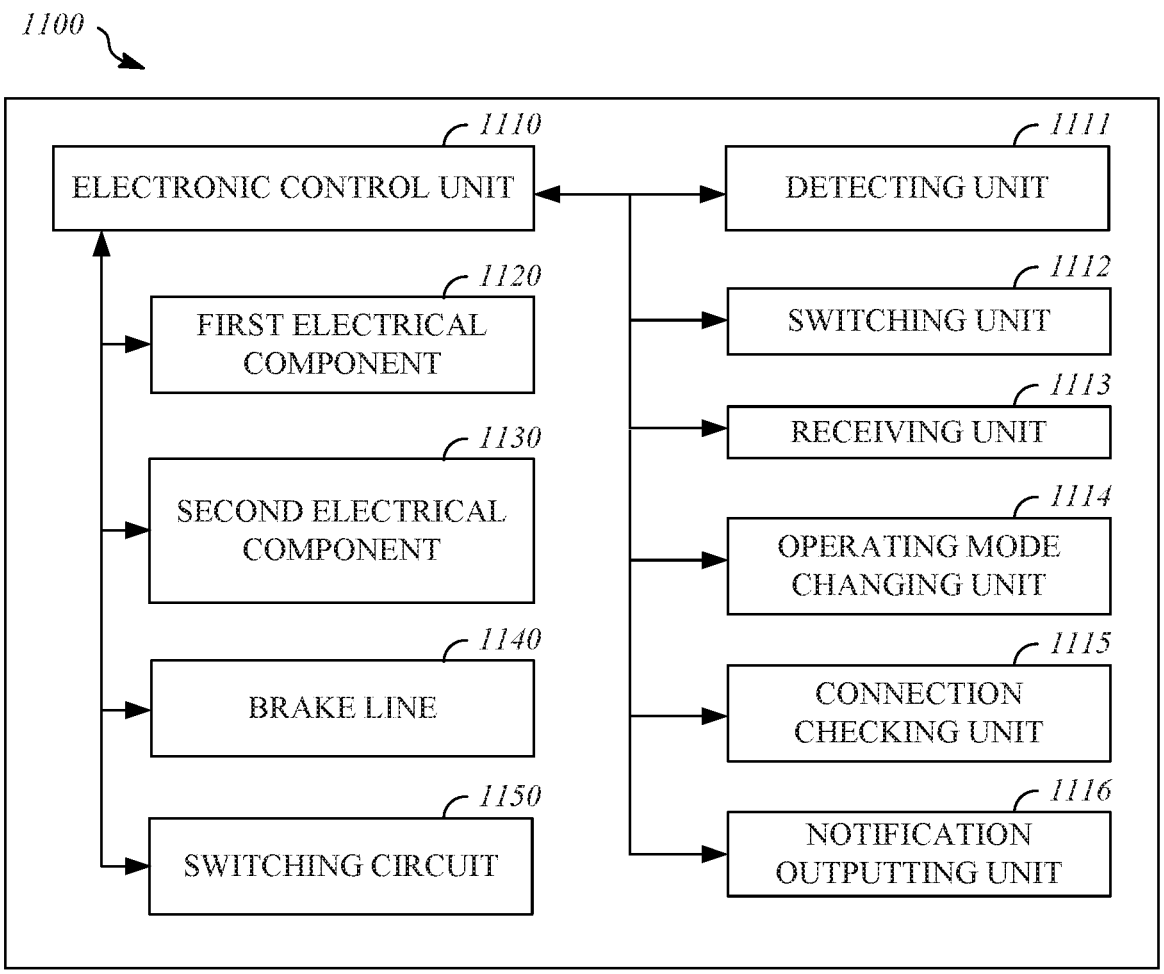
FIG. 11 is a block diagram that shows a system.

FIG. 11 shows a system 1100 that includes an electronic control unit 1110, a first electrical component 1120, a second electrical component 1130, a brake line 1140, and a switching circuit 1150. The system 1100 uses the brake line 1140 as part of an electrical connection between the first electrical component 1120 and the second electrical component 1130 as discussed in previous examples. The switching component can be used to switch an electrical path from a primary electrical connection to a secondary electrical connection that uses the brake line 1140. The electronic control unit 1110 can include a memory that stores instructions that are executable by a processor to define a detecting unit 1111, a switching unit 1112, a receiving unit 1113, and an operating mode changing unit 1114, a connection checking unit 1115, and a notification outputting unit 1116.

Figure 12:
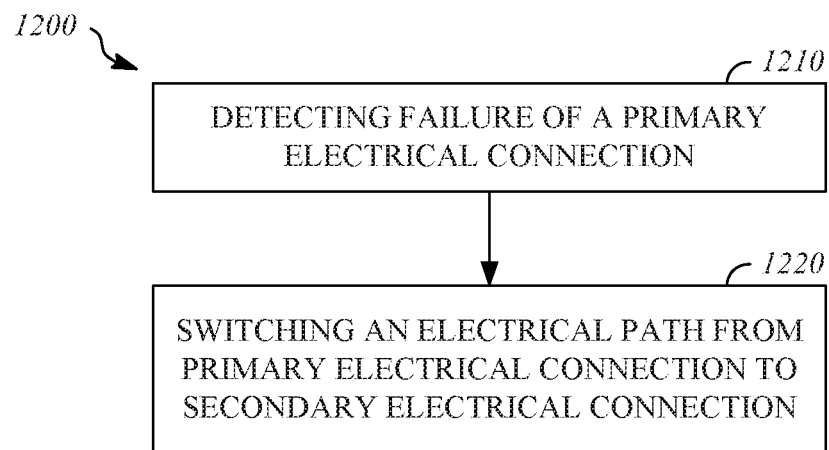
FIG. 12 is a flowchart that shows a method for switching from a primary electrical connection to a secondary electrical connection.

FIG. 12 shows a method 1200 that can be performed by the system 1100 and as additionally described in previous examples. Operation 1210 includes detecting failure of a primary electrical connection which can be performed by the detecting unit 1111. Operation 1220 includes switching an electrical path from a primary electrical connection to a secondary electrical connection that utilizes the brake line 1140, which can be performed by the switching unit 1112.

Figure 13:
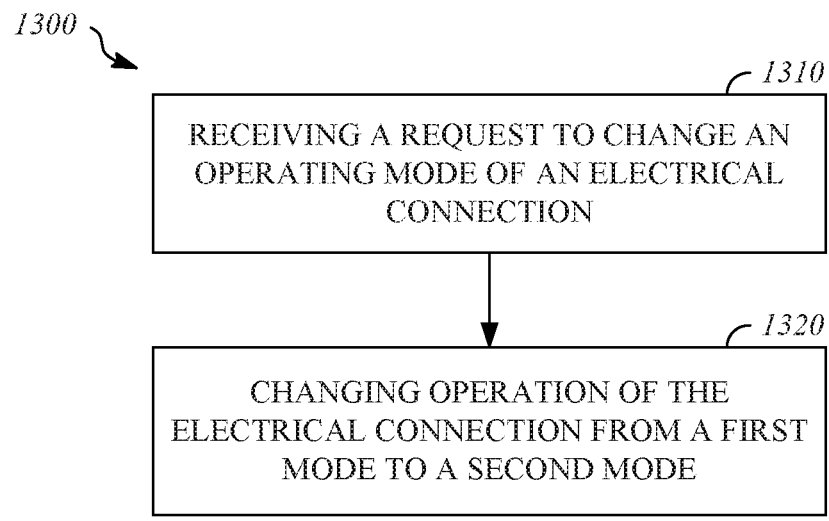
FIG. 13 is a flowchart that shows a method for switching an operating mode of an electrical connection.

FIG. 13 shows a method 1300 that can be performed by the system 1100 and as additionally described in previous examples. Operation 1310 can be performed by the receiving unit 1113 and includes receiving a request to change an operating mode of an electrical connection that utilizes the brake line 1140. Operation 1320 can be performed by the operating mode changing unit 1114 and includes switching a mode of operation of the electrical connection from a first operating mode to a second operating mode. For example, the first operating mode can be a power transmission mode and the second operating mode can be a data signal transmission mode.

Figure 14:
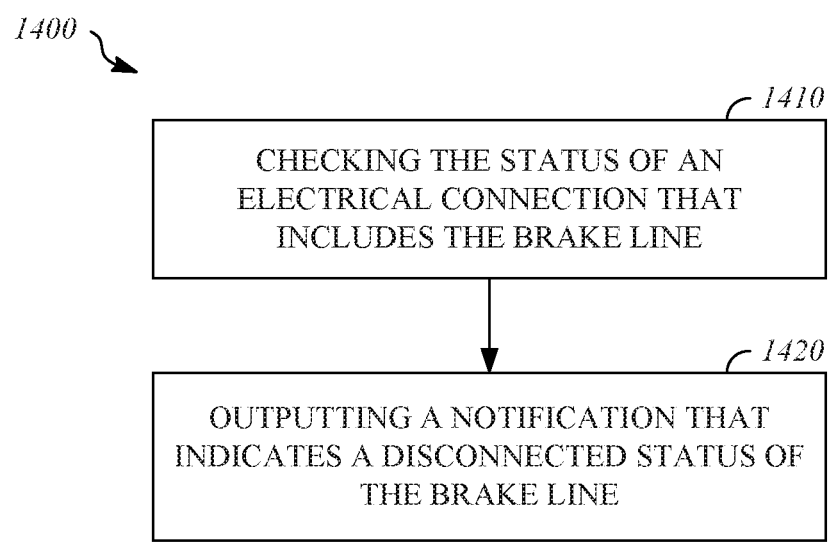
FIG. 14 is a flowchart that shows a method for checking the status of an electrical connection.

FIG. 14 shows a method 1400 that can be performed by the system 1100 and as additionally described in previous examples. Operation 1410 can be performed by the connection checking unit 1115 and includes checking the status of an electrical connection that includes the brake line 1140 such as by a continuity check, where failure of the continuity check indicates a disconnected status of the brake line 1140 and success of the continuity check indicates a connected status of the brake line 1140. In response to detecting the disconnected status, operation 1420 can be performed by the notification outputting unit and can include outputting a notification, such as a warning message presented to the driver visually or audibly, where the warning message indicates that the brake line 1140 is disconnected.

As used herein, the words "example" or "exemplary" are not intended to indicate that any implementation or feature is preferred or advantageous. "Or" is intended to mean an inclusive "or" rather than an exclusive "or" unless otherwise noted or made clear in context. The articles "a" and "an" should be construed to mean "one or more" unless specified otherwise or made clear in context.

The disclosure herein has been made in connection with what are presently considered to be the most practical implementations. It should be understood that the disclosure is intended to cover various modifications and equivalent arrangements.

What is claimed is:

1. An apparatus, comprising:
    a brake line having a conductive tubular structure and a hollow interior for transporting a hydraulic fluid between a first hydraulic component and a second hydraulic component;
    a first electrical component;
    a second electrical component;
    a first electrical connection that is configured to carry at least one of a data signal or electrical power between the first electrical component and the second electrical component;
    a second electrical connection that is configured to carry at least one of the data signal or the electrical power between the first electrical component and the second electrical component, wherein at least part of the second electrical connection is formed by the brake line, the second electrical connection includes a first electrical conductor portion that is connected to the first electrical component and the brake line, and the second electrical connection includes a second electrical conductor portion that is connected to the second electrical component and the brake line; and
    a switch circuit that is connected to the first electrical connection and the second electrical connection, the switch circuit having a first state in which an electrical path is defined using the first electrical connection and a second state in which the electrical path is defined using the second electrical connection.

2. The apparatus of claim 1, further comprising:

a wheel, wherein the first hydraulic component is operable to supply the hydraulic fluid to the second hydraulic component using the brake line, and wherein the second hydraulic component is a hydraulically-actuated brake that is operable to decelerate the wheel.

3. The apparatus of claim 1, further comprising:

a wheel, wherein the first electrical component is an electronic control unit, and wherein the second electrical component is a sensor that is associated with the wheel.

4. The apparatus of claim 1, further comprising:

a vehicle structure; and a nonconductive layer that is disposed on an exterior surface of the brake line to electrically isolate the brake line with respect to the vehicle structure.

5. The apparatus of claim 1, further comprising:

a nonconductive layer that is disposed on an interior surface of the brake line to electrically isolate the brake line with respect to the hydraulic fluid.

6. The apparatus of claim 1, further comprising:

a vehicle structure;

a first nonconductive layer that is disposed on an exterior surface of the brake line to electrically isolate the brake line with respect to the vehicle structure;

a second nonconductive layer that is disposed on an interior surface of the brake line to electrically isolate the brake line with respect to the hydraulic fluid; and a wheel, wherein the first hydraulic component is operable to supply the hydraulic fluid to the second hydraulic component using the brake line, wherein the second hydraulic component is a hydraulically-actuated brake that is operable to decelerate the wheel, wherein the first electrical component is an electronic control unit, and wherein the second electrical component is a sensor that is associated with the wheel.

\* \* \* \* \*